(12) United States Patent
Koga et al.

(10) Patent No.: US 10,168,687 B2
(45) Date of Patent: Jan. 1, 2019

(54) CONTROL DEVICE, CONTROL PROGRAM AND CONTROL METHOD

(71) Applicant: OMRON Corporation, Kyoto (JP)

(72) Inventors: Tatsuya Koga, Kyoto (JP); Masahiro Murai, Kusatsu (JP)

(73) Assignee: OMRON Corporation, Kyoto (JP)

( * ) Notice: Subject to any disclaimer, the term of this patent is extended or adjusted under 35 U.S.C. 154(b) by 184 days.

(21) Appl. No.: 15/438,653

(22) Filed: Feb. 21, 2017

(65) Prior Publication Data

US 2018/0088553 A1    Mar. 29, 2018

(30) Foreign Application Priority Data

Sep. 27, 2016  (JP) ................. 2016-188290

(51) Int. Cl.
  *G05B 19/18*   (2006.01)
  *G05B 19/404*  (2006.01)
  *B23Q 17/09*   (2006.01)

(52) U.S. Cl.
  CPC ....... *G05B 19/404* (2013.01); *B23Q 17/0961* (2013.01); *G05B 2219/37256* (2013.01); *G05B 2219/39355* (2013.01); *G05B 2219/41161* (2013.01); *G05B 2219/41371* (2013.01); *G05B 2219/41376* (2013.01); *G05B 2219/41379* (2013.01); *G05B 2219/42025* (2013.01); *G05B 2219/42338* (2013.01)

(58) Field of Classification Search
  USPC ......................................................... 700/56
  See application file for complete search history.

(56) References Cited

U.S. PATENT DOCUMENTS 5,602,347 A     2/1997  Matsubara et al.
5,819,202 A  *  10/1998 Sato ................... G05B 19/4061
                                                      702/33

(Continued)

FOREIGN PATENT DOCUMENTS

JP     2014-195847     10/2014

OTHER PUBLICATIONS

"Search Report of Europe Counterpart Application", dated Sep. 21, 2017, p. 1-p. 10, in which the listed reference was cited.

*Primary Examiner* — Mohammad Ali
*Assistant Examiner* — Md Azad
(74) *Attorney, Agent, or Firm* — JCIPRNET

(57) ABSTRACT

The invention provides a control device comprising: an actual value obtaining part, obtaining a torque actual value and a velocity actual value, wherein the torque actual value represents a torque generated by the driving source and the velocity actual value represents a velocity of the motion body; an inferring part, which calculates an external force inferred value and a velocity inferred value every other operation period based on the torque actual value by using an operation formula of a predetermined model representing driving of the motion body, wherein the external force inferring value represents an external force generated by the control system; and an output part, evaluating a reliability of the external force inferred value based on the velocity inferred value calculated together if the inferring part calculates the external inferred value, and effectively outputting the external force inferred value when it is judged that there is a designated reliability.

6 Claims, 13 Drawing Sheets

(56) References Cited

U.S. PATENT DOCUMENTS

| | | | | |
|---|---|---|---|---|
| 2012/0283851 A1* | 11/2012 | Yamamoto | ............ | G05B 19/19 700/56 |
| 2013/0278196 A1* | 10/2013 | Tian | .................. | G05B 13/0265 318/430 |
| 2017/0357243 A1* | 12/2017 | Takayama | .......... | G05B 19/4065 |

* cited by examiner

| | same_dim_observer | |
|---|---|---|
| Object axis — | Axis  busy | — Execution intermediate flag |
| Executing a start flag — | exe  estimated_force | — External force inferred value |
| Mass coefficient — | M  est_force_belief | — External force inferred value (Reliability reflecting) |
| Viscosity resistance — | D | |
| Convergence parameter — | pole_real | |
| RatingTorque — | rating_torque | |
| Pitch — | pitch | |
| Operation period — | sampletime | |
| Reliability threshold — | belief_threshold | |

FIG. 13

CONTROL DEVICE, CONTROL PROGRAM AND CONTROL METHOD

CROSS-REFERENCE TO RELATED APPLICATION

This application claims the priority benefit of Japanese application serial no. 2016-188290, filed on Sep. 27, 2016. The entirety of the above-mentioned patent application is hereby incorporated by reference herein and made a part of this specification.

BACKGROUND OF THE INVENTION

1. Field of the Invention

The present invention relates to a control device, a control program and a control method, which infer characteristics of an object.

2. Description of Related Art

As an example of an industrial device, there is a constitution as follows: through relative movement between two objects, a friction force generated between the two objects is used, etc. For example, there is an imprinter as follows: by pressing a tool on an object and changing a position relation between the object and the tool along with time, any characters and numbers are formed on the surface of the object. As such a constitution using the friction force, various machine tools or lathe devices are further listed.

In this constitution using the friction force, there is a problem as follows: the generated friction force is reduced caused by wear of the tool generating the friction force, and a cutting quantity of the tool for the object is reduced. In order to realize a stable imprinting action, it is important to manage the cutting quantity.

JP patent publication No. 2014-195847 (patent document 1) discloses a method for detecting wear of such tool. Specifically, patent document discloses the constitution as follows: when a variation of a rotation torque value rotationally driving a grinding table exceeds a designated value, an alarm is sent to a user.

BACKGROUND TECHNICAL DOCUMENT

Patent Document

Patent document 1: JP patent publication No. 2014-195847

SUMMARY OF THE INVENTION

Problem to be Solved by the Invention

The constitution disclosed in patent document 1 can be applied to for example a constitution that repeatedly executes predetermined actions, but is difficultly applied to a constitution of which the actions are different according to requirements or processing. For example, in the imprinter, different characters are formed according to a sequence of A, B, C . . . , and the wear of the tool cannot be detected only depending on the variation of the rotation torque value.

Therefore, a constitution which can infer an external force containing the above friction force with a better precision is expected.

Means for Solving the Problem

According to an embodiment of the present invention, there is provided a control device that controls a control system which contains a motion body and a driving source driving the motion body. The control device comprises: an actual value obtaining part, obtaining a torque actual value and a velocity actual value, wherein the torque actual value represents a torque generated by the driving source for driving the motion body and the velocity actual value represents a velocity of the motion body; and an inferring part, which calculates an external force inferred value and a velocity inferred value every other operation period based on the torque actual value by using an operation formula of a predetermined model representing driving of the motion body, wherein the external force inferred value represents an external force generated by the control system, and the velocity inferred value corresponds to the external force inferred value and represents a velocity of the motion body. The operation formula contains items for updating the velocity inferred value and the external force inferred value such that the velocity actual value and the velocity inferred value are consistent. The control device comprises an output part, if the inferring part calculates the external force inferred value, then a reliability of the external force inferred value is evaluated based on the velocity inferred value calculated together, and when it is judged that there is a designated reliability, the external force inferred value is effectively output.

Preferably, the output part judges that there is the designated reliability when a difference between the velocity inferred value and the corresponding velocity actual value is smaller than a predetermined value.

Preferably, the output part outputs zero as the external force inferred value when judging that there is no designated reliability.

Preferably, the output part maintains an output value of the external force inferred value output at the previous time when judging there is no designated reliability.

Preferably, the operation formula contains a mass coefficient of the motion body and a viscosity resistance of the motion body as parameters.

Preferably, the control device further comprises a statistical part, which, specific to the external force inferred value output by the output part in a designated period, divides the designated period into a plurality of periods and outputs distribution of a generation probability of the external force inferred value in each divided period.

According to an embodiment of the present invention, there is provided a control program that controls a control system which contains a motion body and a driving source driving the motion body. The control program causes a computer to execute the steps as follows: obtaining a torque actual value and a velocity actual value, wherein the torque actual value represents a torque generated by the driving source for driving the motion body and the velocity actual value represents a velocity of the motion body; and calculating an external force inferred value and a velocity inferred value every other operation period based on the torque actual value by using an operation formula of a predetermined model representing driving of the motion body, wherein the external force inferred value represents an external force generated by the control system, and the velocity inferred value corresponds to the external force inferred value and represents a velocity of the motion body. The operation formula contains items for updating the velocity inferred value and the external force inferred value such that the velocity actual value and the velocity inferred value are consistent. The control program causes the computer to execute the steps as follows: evaluating a reliability of the external force inferred value based on the velocity inferred value calculated together if the external force inferred value is calculated, and effectively outputting the external force inferred value when it is judged that there is a designated reliability.

According to an embodiment of the present invention, there is provided a control method that controls a control system which contains a motion body and a driving source driving the motion body. The control method comprises the steps as follows: obtaining a torque actual value and a velocity actual value, wherein the torque actual value represents a torque generated by the driving source for driving the motion body and the velocity actual value represents a velocity of the motion body; and calculating an external force inferred value and a velocity inferred value every other operation period based on the torque actual value by using an operation formula of a predetermined model representing driving of the motion body, wherein the external force inferred value represents an external force generated by the control system, and the velocity inferred value corresponds to the external force inferred value and represents a velocity of the motion body. The operation formula contains items for updating the velocity inferred value and the external force inferred value such that the velocity actual value and the velocity inferred value are consistent. The control method comprises the steps as follows: evaluating a reliability of the external force inferred value based on the velocity inferred value calculated together if the external force inferred value is calculated, and effectively outputting the external force inferred value when it is judged that there is a designated reliability.

Effects of the Invention

According to the embodiments of the present invention, an external force generated by a control system of the object can be inferred with a better precision.

BRIEF DESCRIPTION OF THE DRAWINGS

FIG. 13 is a diagram illustrating an example of function blocks for defining execution of the control method of the present embodiment on a user program.

DESCRIPTION OF THE EMBODIMENTS

Figure 1:
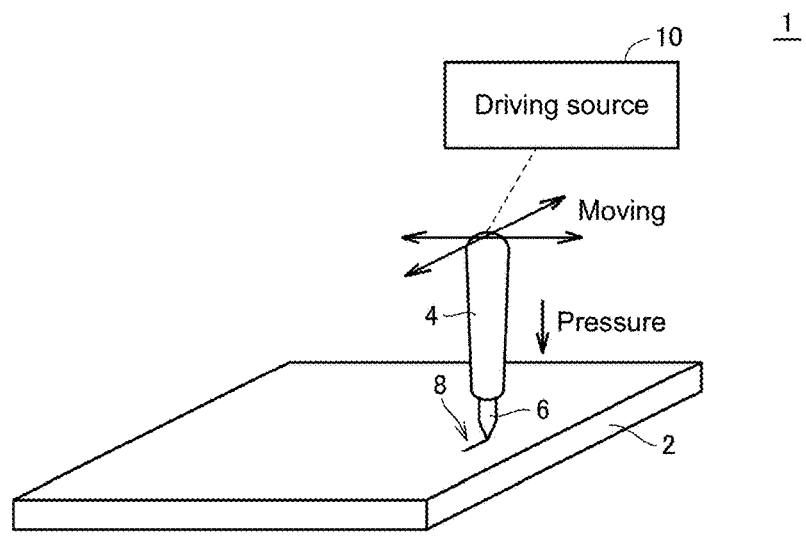
FIG. 1 is a schematic diagram illustrating an example of a machining device of the present embodiment.

The embodiments of the present invention are explained in detail by referring to the drawings. In addition, the same or equivalent parts in the drawings are appended with same signs and are not repeatedly explained.

A. Constitution the Example of a Machining Device

At first, an example of a machining device of the present embodiment is explained. FIG. 1 is a schematic diagram illustrating an example of a machining device 1 of the present invention. As an example, the machining device 1 as shown in FIG. 1 has a constitution similar to an imprinter.

Referring to FIG. 1, the machining device 1 comprises an object 2 forming characters and serving as an object and a holding part 4. A tool for cutting 6 is mounted on the front end of the holding part 4, the object 2 is endowed with a pressure from the holding part 4, a relative position between the object 2 and the holding part 4 is changed, and therefore, an imprint 8 is formed on the surface of the object 2. In the constitution as shown in FIG. 1, an example that the holding part 4 is a motion body is shown. That is, a driving source 10 is used to drive the holding part 4, and therefore, a position of the holding part 4 relative to the object 2 is changed in sequence, accordingly, the imprints are formed on the surface of the object 2 in sequence. The machining device 1 is equivalent to a control system containing the object 2 as a motion body and the driving source 10 driving the object 2. The machining device 1 is controlled by a control device as follows.

B. Constitution of the Control Device

Figure 2:
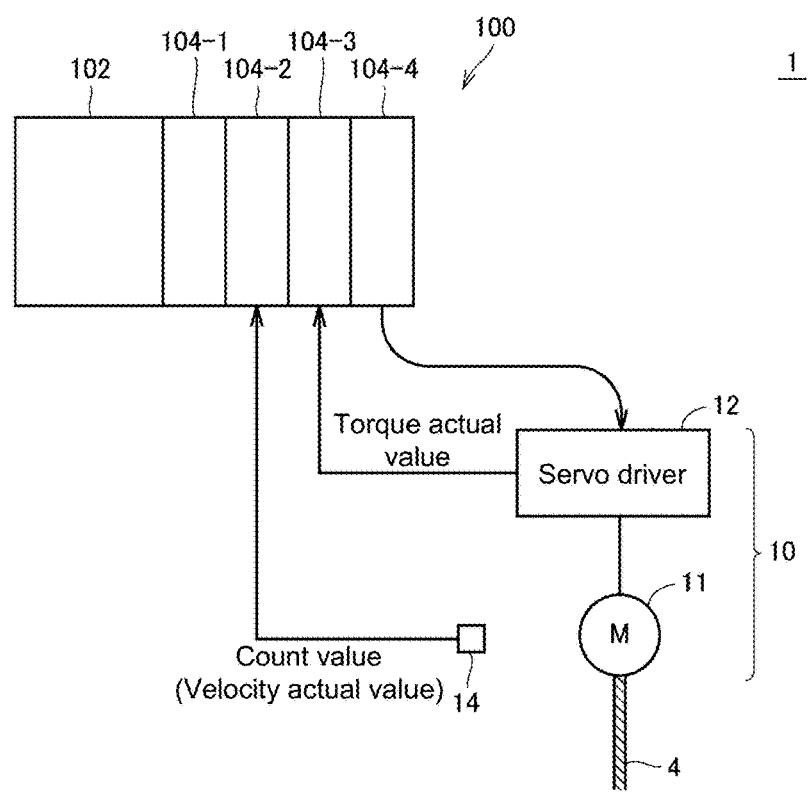
FIG. 2 is a schematic diagram summarily illustrating a correlation constitution of a control device contained by the machining device of the present embodiment.

Next, a constitution example of the control device for controlling the driving source 10 as shown in FIG. 1 is explained. FIG. 2 is a schematic diagram summarily illustrating a correlation constitution of a control device 100 contained by the machining device 1 of the present embodiment.

Referring to FIG. 2, the machining device 1 contains the control device 100 mainly responsible for controlling the driving source 10. The control device 100 can be mounted by using any computer or hardware logic, in the explanation as follows, typically, a case of a Programmable Logic Controller (PLC) as an example of an industrial computer is explained.

The control device 100 contains an operation processing unit 102, one or more function units 104-1, 104-2, 104-3, 104-4 . . . (also called as a joint name "function unit 104" hereinafter).

Figure 3:
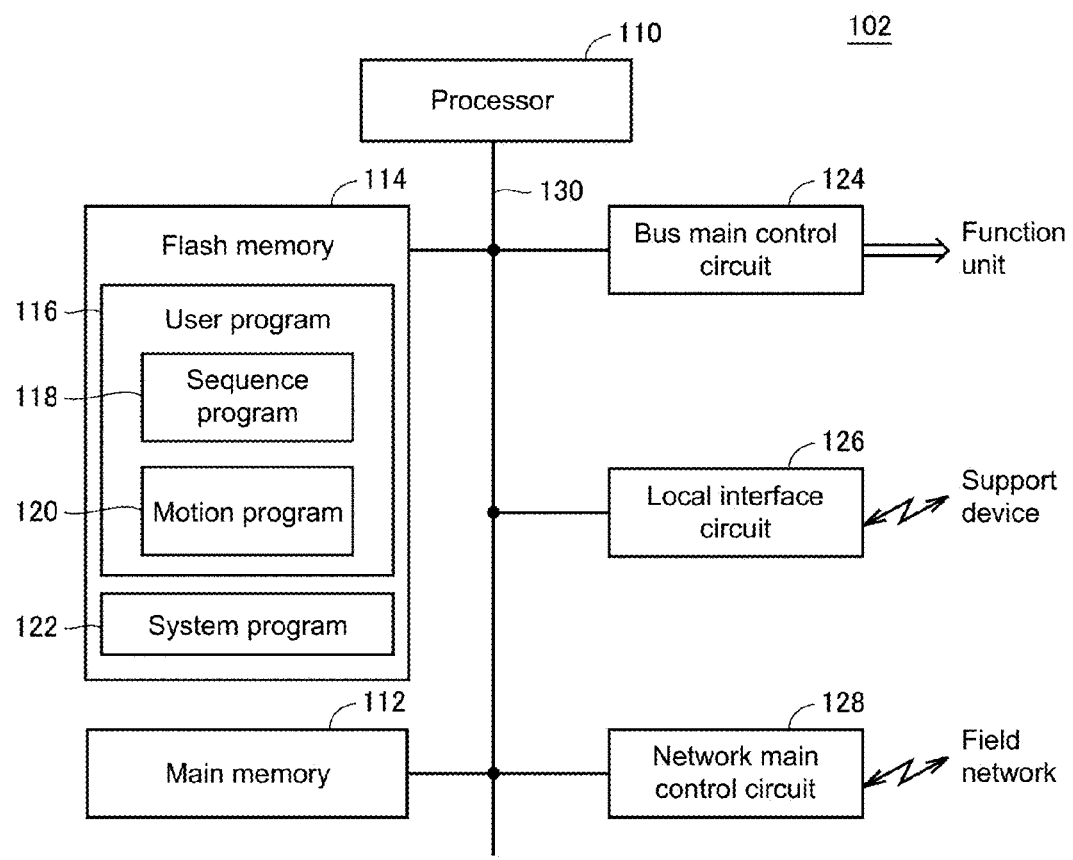
FIG. 3 is a schematic diagram summarily illustrating a constitution of an operation processing unit of the control device as shown in FIG. 2.

FIG. 3 is a schematic diagram summarily illustrating a constitution of an operation processing unit 102 of the control device 100 as shown in FIG. 2. Referring to FIG. 3, in the operation processing unit 102, the processor provides various processing containing a control method of the present embodiment by executing a system program 122 and a user program 116.

Specifically, the operation processing unit 102, as a main component, contains a processor 110, a main memory 112, a second memory device 114, a bus main control circuit 124, a local interface circuit 126 and a network main control circuit 128.

The processor 110 is an operation part executing commands described in various programs in sequence, and typically comprises a Central Processing Unit (CPU), or Graphic Processing Unit (GPU), etc. As the processor 110, any of a multicore constitution, a multiprocessor constitution or parallel constitution of both can be used.

The main memory 120 is a memory device providing a working region when the processor 110 executes programs. As the main memory 112, a volatile memory such as a Dynamic Random Access (DRAM) or a Static Random Access Memory (SRAM) can be used.

The second memory device 114 stores various programs and various configurations executed by the processor 110, and as the secondary memory device 114, a non-volatile memory such as a Hard Disk Drive (HDD) or a Solid State Drive (SSD) can be used. To be more specifically, the secondary memory device 114 stores the system program 122 and the user program 116 which are of a control program. The control program controls the control system contained in the machining device 1.

The system program 122 is equivalent to a program of an Operating System, and provides functions provided by the operation processing unit 102 on a basic system or is used for executing an environment of the user program 116. The user program 116 freely generates, typically, a sequence program 118 giving a first place to logic operation and a motion program 120 giving a first place to numerical operation such as position control and velocity control, according to a control object of the control device 100. The control method of the present embodiment can also be mounted as part of the motion program 120.

The bus main control circuit 124 manages data transmission on an internal bus exchanging data with the function unit 104 (referring to FIG. 2).

The local interface circuit 126 is an interface exchanging data with a supporting device or other external devices, and for example, adopts a transmission standard such as a Universal Serial Bus (USB).

The network main control circuit 128 manages data transmission on a field network exchanging data with the function unit configured in a position away from the control device 100 or other control devices. As such field network, a fixed period network such as EtherCAT (registered trademark), EtherNet/IP (registered trademark), DeviceNet (registered trademark), CompoNet (registered trademark) and the like can be used.

Referring to FIG. 2 again, the function units 104 connected to the operation processing unit 102 provide various functions for realizing any control of the control device 100 on the control object. Typically, each function unit 104 has a function of collecting field information of machinery or equipment as the control object (data collecting function) and/or a function of output a command signal to the machinery or equipment as the control object (data outputting function), etc.

In the constitution as shown in FIG. 2, the function unit 104-4 plays a role as a servo control unit, and provides a command value calculated by the operation processing unit 102 through executing the program (mainly the motion program 120 as shown in FIG. 3) every other operation period for a servo driver 12.

As a constitution corresponding to the driving source 10 as shown in FIG. 1, FIG. 2 shows the constitution of a motor 11 driven by the servo driver 12. The servo driver 12 drives the motor 11 (a servomotor in the example as shown in FIG. 2) according to a command value from the control device 100. Typically, the servo driver 12 outputs a pulse quantity corresponding to the command value from the control device 100 to the motor 11, and the motor 11 changes a rotation position according to the received pulse number. By adopting such constitution, the pulse number given to the motor 11 is properly adjusted, and therefore, a rotation position, a rotation velocity, a torque and the like of the motor 11 are controlled.

The servo driver 12 inputs the size of an actual torque (called as "torque actual value" hereinafter) required for driving the motor 11 to the function unit 104-3. Besides, a counter 14 for feeding back a rotation action of the motor 11 is configured, and a count value detected by the counter 14 is input to the function unit 104-2. According such count value, an actual rotation velocity (also called as "velocity actual value" hereinafter) of the motor 11 is calculated or the rotation position of the motor 11 is calculated or the position of the holding part 4 as the motion body is calculated.

The control device 100, as a device obtaining the torque actual value of a torque generated by the driving source 10 in order to drive the object 2 as the motion body, has an interface with the servo driver 12. In addition, the control device 100, as a device obtaining the velocity actual value of a velocity of the object 2 as the motion body, has an interface with the counter 14.

The control device 100 in the present embodiment uses the torque actual value and the velocity actual value obtained from the driving source 10 to calculate an external force generated by the control system. By using the calculated external force, additional processing such as monitoring on an action state or degradation state of the machining device 1, a replacement time sequence of consumed pats and the like are executed.

C. External Force

An external force generated by the control system constituted by the machining device 1 and determination or calculation of this external force of the present embodiment are explained.

(c1: Summary)

Figure 4A:
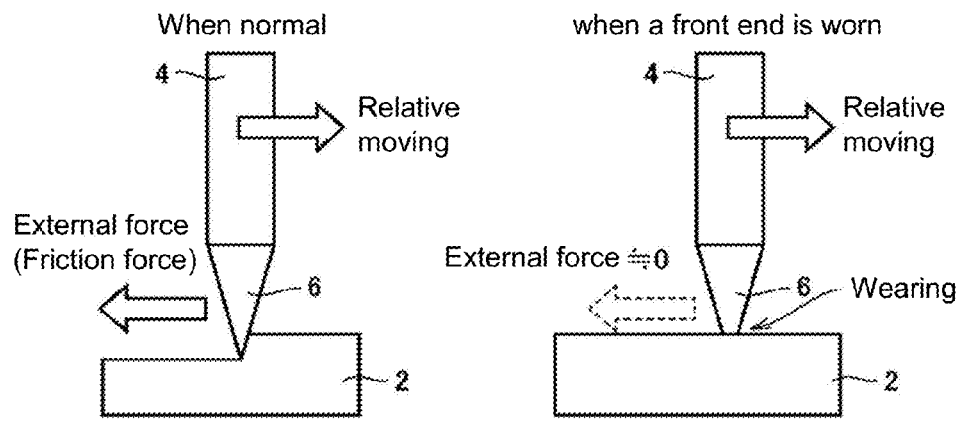
FIGS. 4(a) and 4(b) are schematic diagrams for explaining an influence when a front end part in the machining device as shown in FIG. 1 is worn.
Figure 4B:

At first, an external force generated by the machining device 1 as shown in FIG. 1 is explained. FIGS. 4(a) and 4(b) are schematic diagrams for explaining an influence when a front end part in the machining device 1 as shown in FIG. 1 is worn.

As shown in FIG. 4(a), by moving the holding part 4 and a tool configured at its front end relative to the object 2, a friction force is generated between the tool 6 and the object 2, and the external force reflecting the friction force will act on the object 2. But, if the tool 6 located at the front end part is worn, the friction force generated between the tool 6 and the object 2 is reduced or turned into 0 essentially, and then the external force acting on the object 2 is also reduced or turned into 0 essentially.

As a result, As shown in FIG. 4(b), a slot forming an imprint of the object 2 is shallowed, and a visual recognizability of the formed imprint is reduced. Therefore, in the machining device 1 as shown in FIG. 1, it is important to monitor the external force acting on the object 2 constantly.

(c2: Calculation of the External Force)

Figure 5:
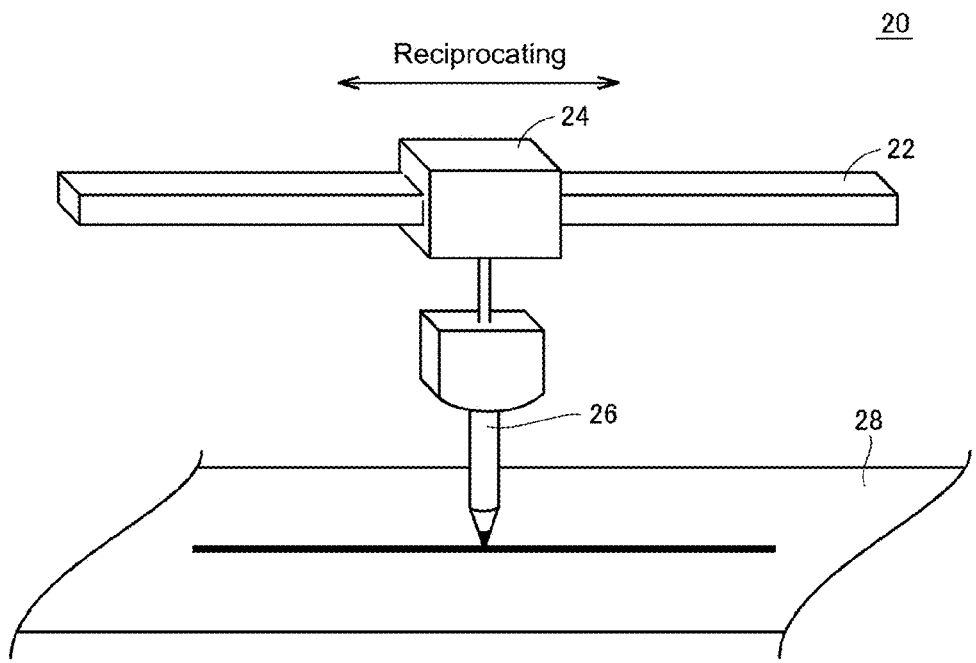
FIG. 5 is a schematic diagram illustrating a summary of a test device for evaluating an external force.
Figure 6A:
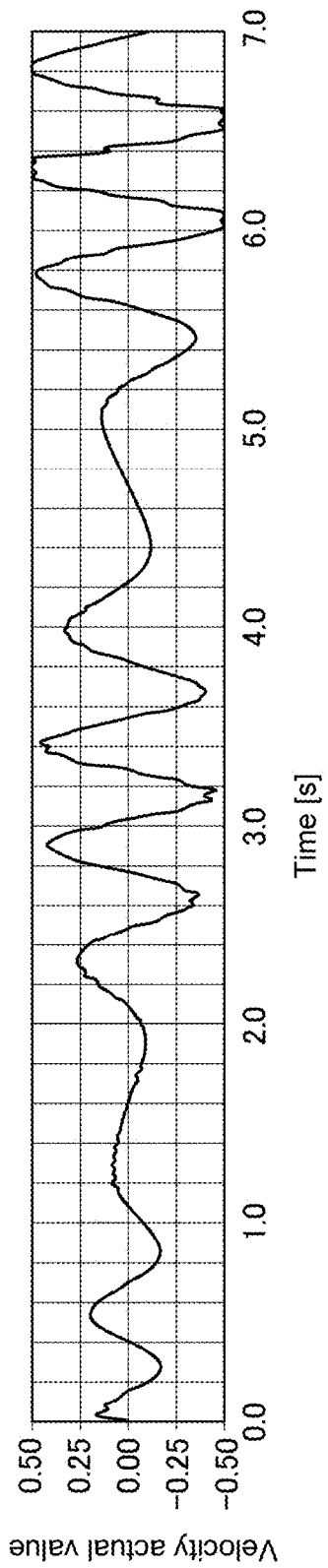
FIGS. 6(a) and 6(b) are curve diagrams illustrating an example of a time change of a velocity actual value and a torque actual value determined in the test device as shown in FIG. 5.
Figure 6B:
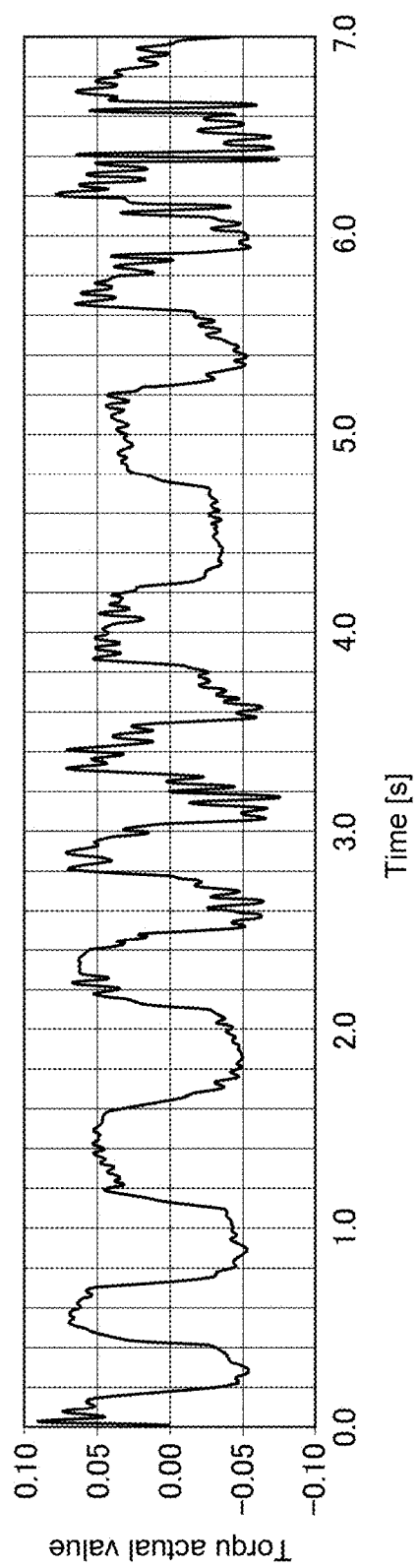

If the above external force cannot be directly observed, then the external force is calculated based on a variation or an of the size of a torque, a force and the like required by the driving source 10 in order to drive the holding part 4. Regarding the calculation of such external force, an example of a determined result of an inventor, et al., of the present invention is expressed. FIG. 5 is a schematic diagram illustrating a summary of a test device for evaluating an external force. FIGS. 6(a) and 6(b) are curve diagrams illustrating an example of a time change of a velocity actual value and a torque actual value determined in the test device as shown in FIG. 5.

In the test device 20 as shown in FIG. 5, the motion body 24 movably configured along a track 22 is reciprocated, such that a pencil 26 configured at the front end of the motion body 24 is worn on a wearing plate 28. FIGS. 6(a) and 6(b) illustrate a time change of a size of a velocity of the motion body 24 (the velocity as shown in FIG. 6(a)) and a torque required for driving the motion body 24 (the torque as shown in FIG. 6(b)) determined in the driving source (the unshown linear motor, servo driver, etc.) which reciprocates the motion body 24.

Actually, the front end of the pencil 26 is continuously worn, therefore, the external force generated to the grinding plate 28 is continued to be reduced along with time due to movement of the pencil 26, but the time change of this external force cannot be calculated only depending on the time change of the velocity and torque as shown in FIG. 6(a) and FIG. 6(b).

(c3: Logic Discussion of the External Force)

Next, reasons why the external force is hard to calculate in the machining device 1 as shown in FIG. 1 are explained.

An equation of motion of the motion body as shown in FIG. 4(a), that is generated by the holding part 4 and the tool 6, is the formula (1) as follows.

$$Mx''+Dx'=F-d \quad (1)$$

wherein,
x: position of the motion body
x': velocity of the motion body
x'': acceleration of the motion body
M: mass coefficient of the device
D: viscosity resistance of the device
F: torque actual value of motor 11 (translation force of motor 11)
d: summation of the external force (depending on a wearing degree) and Coulomb friction($C\text{sign}(x')$)

The formula (1) is transformed to a formula of the external force (depending on the wear degree), which is the formula (2) as follows.

the external force (depending on the wear degree)
$$=F-C\text{sign}(x')-(Mx''+Dx') \quad (2)$$

wherein, sign( ) is a symbolic function

In formula (2), the item $C\text{sign}(x')$ is a fixed factor, and the item $(Mx''+Dx')$ is a variable factor. When the control system as the object executes a same action repeatedly, a change degree of the variable factor in each period is the same among respective periods, therefore, the variable factor can be mutually offset by comparing a torque actual value F (equivalent to the translation force of the motor 11) of the motor 11 in certain period with the torque actual value of an object period, thus, the change degree of the target external force (depending on the wearing degree) can be obtained without an influence from the variable factor.

In the other aspect, if the control system as the object does no execute the same action repeatedly, the variable factor cannot be offset by using the actual values obtained in other periods, therefore, a relation between the torque actual value and the external force (depending on the wearing degree) will be affected by the variable factor. It means that the external force (depending on the wearing degree) cannot be calculated only depending on the torque actual value.

As a result, as shown in FIG. 6(a), when the velocity of the motion body has no regularity, the actual torque also has no regularity and the external force cannot be properly calculated.

D. The External Force being Inferred by Using a Disturbance Observer (d1: Introduction of the Disturbance Observer)

Figure 7:
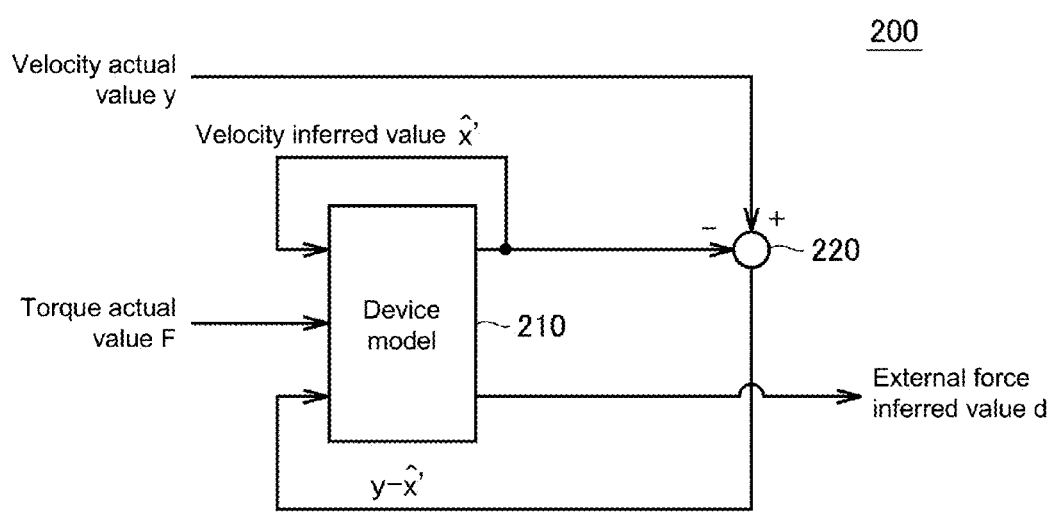
FIG. 7 is a block diagram illustrating a summary constitution of a disturbance observer adopted in a control method of the present embodiment.

Specific to the above project, in the control method of the present embodiment, the generated force is inferred by introducing the disturbance observer. FIG. 7 is a block diagram illustrating a summary constitution of a disturbance observer 200 adopted in a control method of the present embodiment.

In the observer, in order to infer a state variable that cannot be observed from outside, a numerical model representing an observed object is prepared. By inputting an observable state variable input to the observed object to the numerical model, and performing convergence calculation in a manner that output from the numerical model and the observable state variable output from the observed object are consistent, a corresponding state variable value used in such numerical model is used to infer the state variable that cannot be observed for the observed object.

In the disturbance observer 200 as shown in FIG. 7, the device model 210 simulating the machining device 1 as the object is the numerical model, which is equivalent to an operation formula of a predetermined model representing driving of the motion body (being the holding part 4 in the example as shown in FIG. 1). In the numerical model, as actual values, a velocity actual value y and a torque actual value F are used. The state variable representing the external force for operation in the device model 210 is output as an external force inferred value d.

Herein, a specific operation formula of the device model 210 is explained. The formula (1) can be expressed as a state equation as shown in formula (3) as follows.

$$\frac{d}{dt}\begin{bmatrix} \hat{x}' \\ d \end{bmatrix} = \begin{bmatrix} -\frac{D}{M} & -\frac{1}{M} \\ 0 & 0 \end{bmatrix}\begin{bmatrix} \hat{x}' \\ d \end{bmatrix} + \begin{bmatrix} \frac{1}{M} \\ 0 \end{bmatrix}F \quad (3)$$

wherein $\hat{x}'$ is the velocity inferred value.

When the state equation is substituted into a formula of a same dimensional observer, and then expanded as an operation formula calculating the velocity inferred value and external force inferred value in each operation period by using Euler approximation, the formula (3) can be expressed as a recursion formula as shown in formula (4).

$$\begin{bmatrix} \hat{x}'_{n+1} \\ d_{n+1} \end{bmatrix} = \begin{bmatrix} \hat{x}'_n \\ d_n \end{bmatrix} + \left\{ \begin{bmatrix} -\frac{D}{M} & -\frac{1}{M} \\ 0 & 0 \end{bmatrix} \begin{bmatrix} \hat{x}'_n \\ d_n \end{bmatrix} + \begin{bmatrix} \frac{1}{M} \\ 0 \end{bmatrix} F + \begin{bmatrix} G1 \\ G2 \end{bmatrix} (y - \hat{x}'_n) \right\} * \Delta t \quad (4)$$

Wherein, Δt is operation period.

d as the state variable in the formula (4) is calculated as an external force inferred value every other operation period. The first item in a bracket multiplied by the operation period Δt in the formula (4) is an item related to the mass coefficient M and the viscosity coefficient D of the device. That is, the operation formula as shown in formula (4) contains the mass coefficient M of the motion body and the viscosity resistance D of the motion body as parameters. The second item is an item related to the translation force (the torque actual value F) provided by the motor 11s. The third item is an item for convergence based an error of the velocity actual value and the velocity inferred value. The Matrix [G1, G2] of the third item represents a convergence parameter for converging the formula (4) in a manner that the velocity inferred value and the velocity actual value are consistent, and its value is determined according to stability and convergence.

As an example of a deciding method of the convergence parameter, an Ackerman pole assignment method can be used. Typically, in a convergence process of formula (4), the convergence parameter is decided in a critical attenuation manner Such deciding method of the convergence parameter is a known method and is not explained in detail herein.

As shown in formula (4), in the disturbance observer 200, based the torque actual value F, the external force inferred value d expressing the external force generated by the control system and the velocity inferred value expressing the velocity of the motion body corresponding to the external force inferred value d are calculated every operation period Δt. Therefore, the operation formula as shown in formula (4) contains items for updating the velocity inferred value and the external force inferred value so as to cause the velocity actual value and the velocity inferred value to be consistent (that is, multiplied by the third item in the bracket of the operation period Δt).

(d2: Disturbance Observer and Denoising Filter)

Next, an external force generated by the control system can be inferred by using the disturbance observer as mentioned above.

Figure 8A:
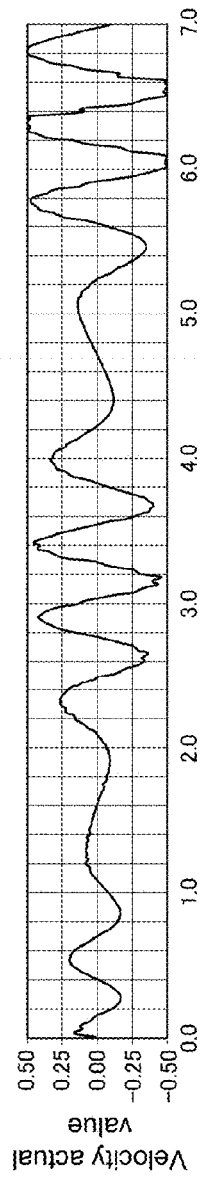
FIGS. 8(a), 8(b) and 8(c) are curve diagrams illustrating an example of a time change of a velocity actual value and a torque actual value determined in the test device as shown in FIG. 6.
Figure 8B:
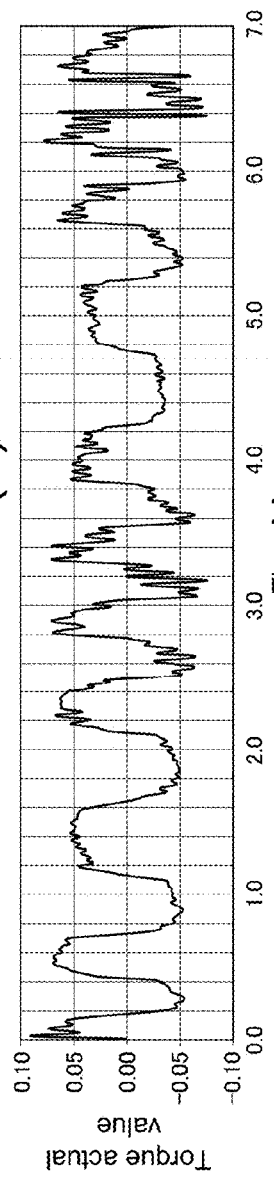
Figure 8C:
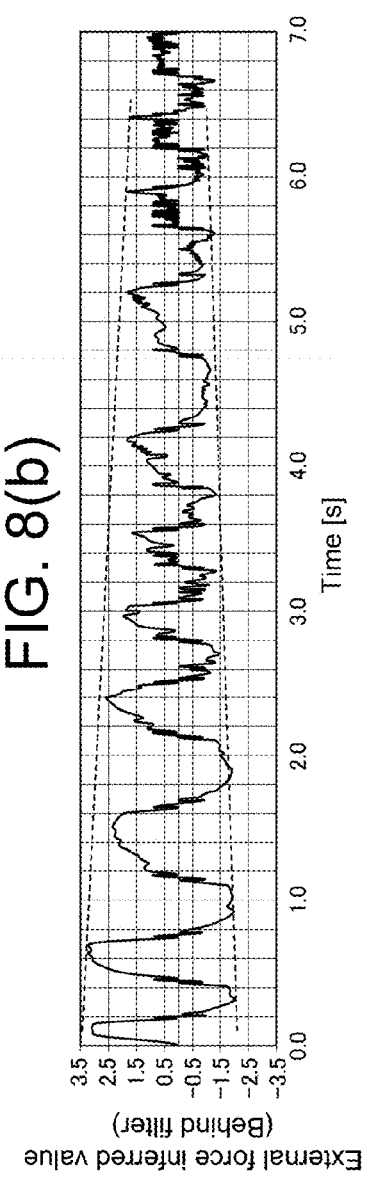

FIGS. 8(a), 8(b) and 8(c) are curve diagrams illustrating an example of a time change of a velocity actual value and a torque actual value determined in the test device as shown in FIGS. 6(a) and 6(b). FIGS. 8(a) and 8(b) respectively express the velocity actual value as shown in FIG. 6(a) and the torque actual value as shown in FIG. 6(b). FIG. 8(c) expresses a time change of the external force inferred value calculated according to the operation formula as shown in formula (4) based on these actual values.

The external force inferred value as shown in FIG. 8(c) expresses a result that a denoising filter is applied to the external force inferred value calculated according to the operation as shown in formula (4) every other operation period. By applying a proper denoising filter, it can be known that the external force generated by the control system is continuously reduced along with time. The external force is reduced along with time, which fully corresponds to a phenomenon generated by a test device as shown in FIG. 5, and it can be known that by using a combination of the disturbance observer and the optimal denoising filter, the external force generated by the control system can be inferred with a better precision.

(d3: Disturbance Observer and Output Limiting Function)

In order to obtain the time change of the external force inferred value as shown in FIG. 8(c), the setting of the denoising filter needs to be optimized. However, when the denoising filter is set, technical knowledge and experience are required, and when noise components cannot be effectively removed, the external force inferred value cannot be properly obtained.

Figure 9:
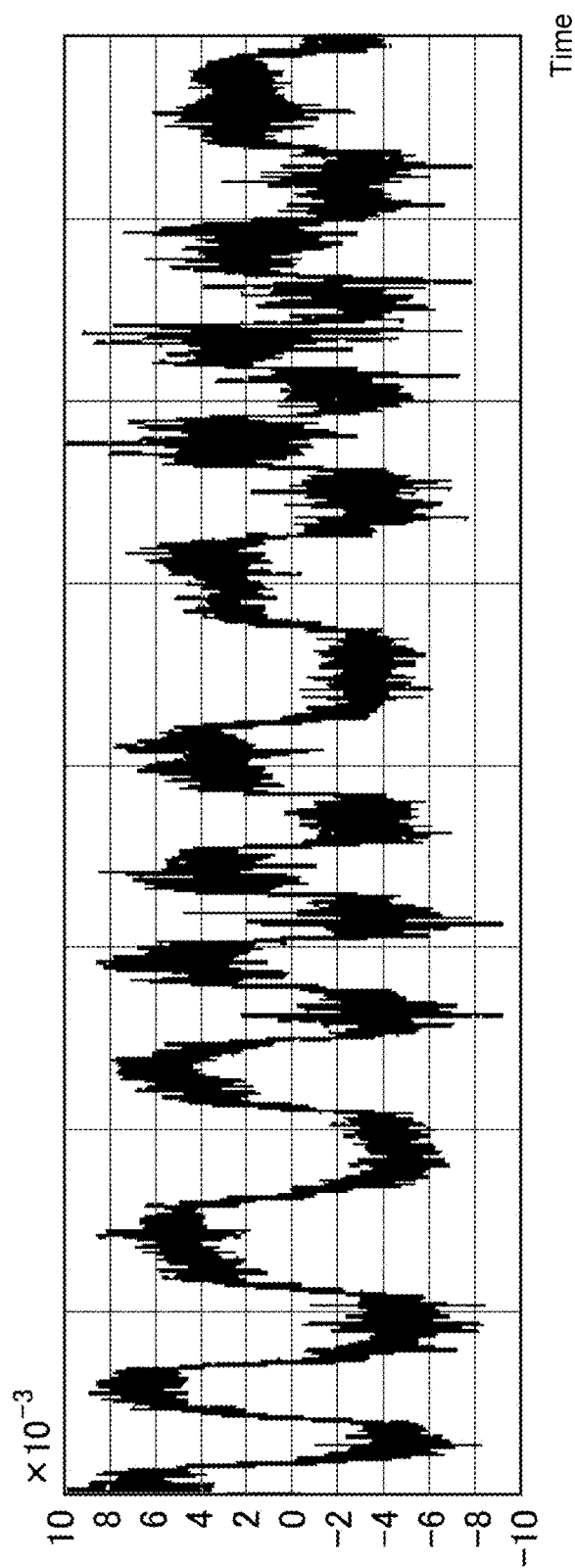
FIG. 9 is a diagram illustrating an example of a time change of an external force inferred value calculated according to an operation formula as shown in formula (4) every other operation period.

FIG. 9 is a diagram illustrating an example of a time change of an external force inferred value calculated according to an operation formula as shown in formula (4) every other operation period. As shown in FIG. 9, the external force inferred value calculated every other operation period contains many noise components, and as a result, the time change of the external force generated by the control system cannot be mastered in short time sometimes. If the time change as shown in FIG. 9 is checked carefully, then a tendency that the external force is reduced along with time will be found, but it is difficult to master in short time.

This is because that an inferred value output by the disturbance observer does not have high reliability all the time. That is, in the operation formula as shown in formula (4), although convergence is performed according to an error correction inferred value of the velocity actual value and the actual inferred value, in this convergence process, an interval with low reliability due to a large difference between the velocity actual value and the velocity inferred value exists. Therefore, based on the above understandings of the inventor, et al., of the present application, a following function is adopted, when the disturbance observer 200 outputs the external force inferred value, the reliability of the external force inferred value is evaluated, and the calculated external force inferred value is effectively output only when the reliability exceeds a designated value.

In the control method of the present embodiment, the reliability is evaluated based on the value obtained in the operation process that the disturbance observer 200 calculates the external force inferred value, if the value of the reliability is smaller than or equal to the designated value, then zero is output as the external force inferred value. Through combining such output limiting function in the disturbance observer, the external force inferred value with a low reliability can be excluded and the external force inferred value can be properly evaluated.

Thus, the output limiting function is as follows: if the disturbance observer 200 calculates the external force inferred value, then the reliability of the external force inferred value is evaluated based on the velocity inferred value calculated together, and the external force inferred value is effectively output when it is judged that the designated reliability exists.

Figure 10A:
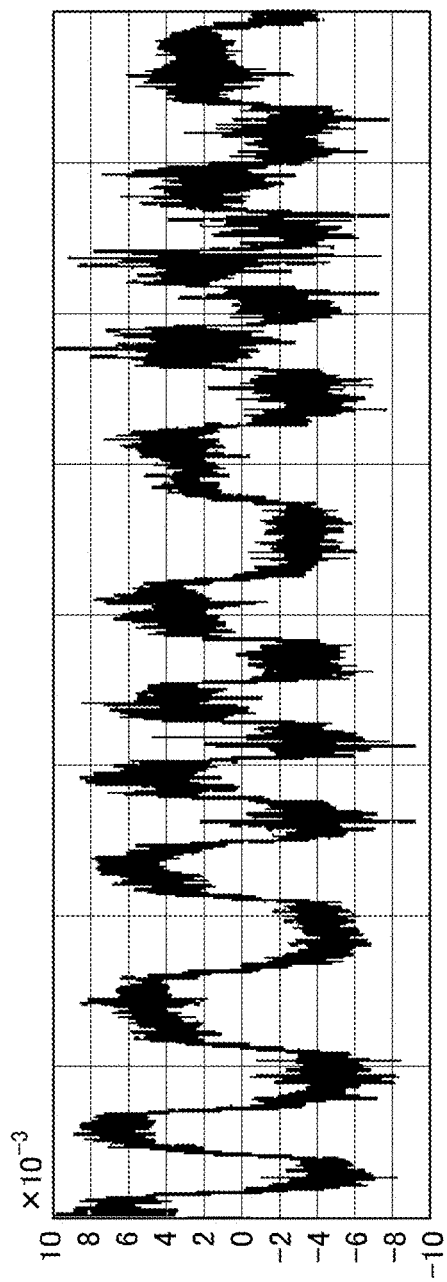
FIGS. 10(a) and 10(b) are diagrams illustrating a comparison between an example of an external force inferred value obtained when the operation formula as shown in formula (4) is appended with an output limiting function with a case without the output limiting function.
Figure 10B:
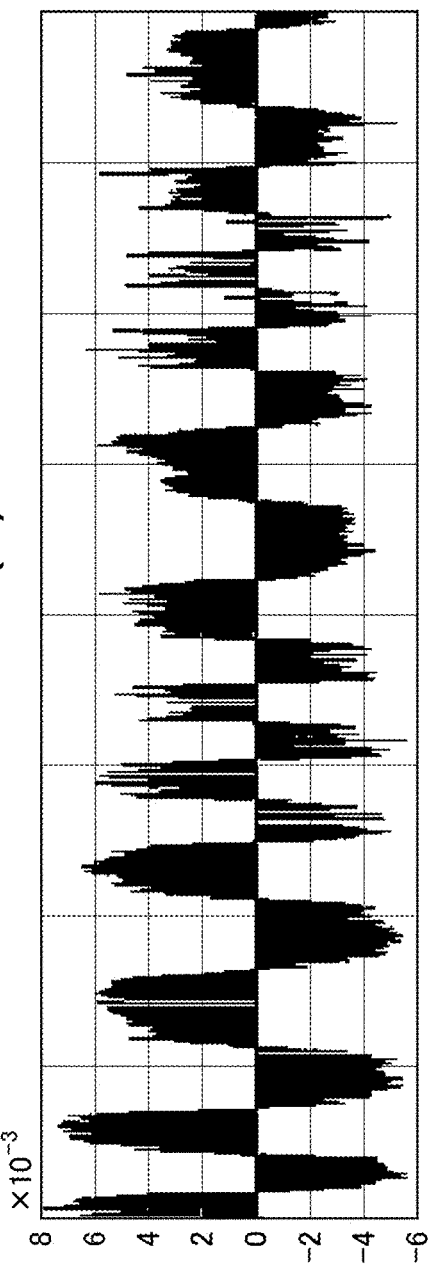

FIGS. 10(a) and 10(b) are diagrams illustrating a comparison between an example of an external force inferred value obtained when the operation formula as shown in formula (4) is appended with an output limiting function with a case without the output limiting function. FIG. 10(a) illustrates a time waveform of the external force inferred value as shown in FIG. 9 and FIG. 10(b) illustrates a time waveform of the external force inferred value when the output limiting function is applied.

By comparing FIG. 10(a) and FIG. 10(b), it can be known that through applying the output limiting function of the present embodiment, the external force inferred value with a low reliability, i.e., the noise component can be excluded, and therefore, the time change of the output external force inferred value can be more easily mastered.

Figure 11:
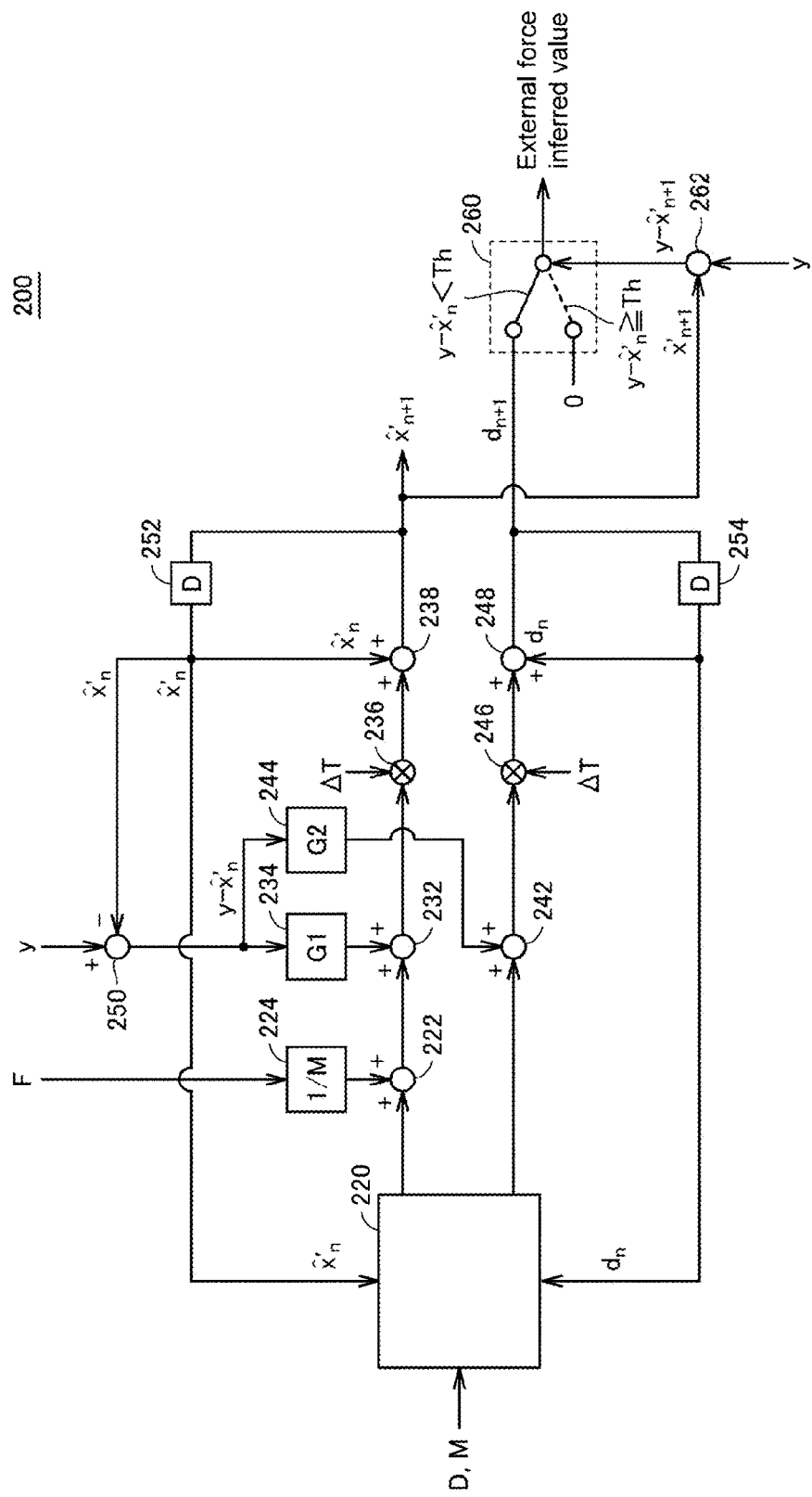
FIG. 11 is a block diagram illustrating operation processing of a disturbance observer applying an output limiting function of the present embodiment.

FIG. 11 is a block diagram illustrating operation processing of a disturbance observer applying an output limiting function of the present embodiment. Referring to FIG. 11, the disturbance observer 200 contains a mass/viscosity resistance operation block 220. In the mass/viscosity resistance operation block 220, the operation of multiplying by the first item in the bracket of the operation period Δt of the formula (4) is executed. In the mass/viscosity resistance operation block 220, the velocity inferred value and the external force inferred value in the operation period at the previous time are respectively input thereto. The mass/viscosity resistance operation block 220 outputs a value related to the velocity inferred value and a value related to the external force inferred value.

On the value related to the velocity inferred value from the mass/viscosity resistance operation block 220, by an addometer 222, a coefficient block 224 is added to the value obtained by multiplying the torque actual value F by "1/M". Besides, by an addometer 232, a coefficient block 234 is added to the value obtained by multiplying a difference between the velocity actual value and the velocity inferred value by "G1". By using a multiplier 236, an adding result of the addometer 232 is multiplied by the operation period Δt, and finally, the velocity inferred value in the operation period at the previous time is added as the velocity inferred value on this time for outputting.

In the other aspect, on the value related to the external force inferred value from the mass/viscosity resistance operation block 220, by an addometer 242, a coefficient block 244 is added to the value obtained by multiplying the difference between the velocity actual value and the velocity inferred value by "G2". By using a multiplier 246, an adding result of the addometer 242 is multiplied by the operation period Δt, and finally, the external force inferred value in the operation period at the previous time is added as the velocity inferred value on this time for outputting.

The final velocity inferred value and external force inferred value are input to a delay block 252 and a delay block 254 giving a delay corresponding to the operation period for the operation period next time. That is, the explained velocity inferred value and external force inferred value at the previous time use the output from the delay blocks 252 and 254.

In addition, the difference between the velocity actual value and the velocity inferred value is calculated by performing differential operation on the velocity actual value and the velocity inferred value through a difference block 250.

In the disturbance observer 200 as shown in FIG. 11, in a process that $d_{n+1}$ as an internal state value is output as an external force inferred value, a switching block 260 is configured. The switching block 260 can select calculated internal state values $d_{n-1}$ and "0". To be more specifically, when the difference between the velocity actual value and the velocity inferred value is smaller than a predetermined threshold Th, the switching block 260 outputs the $d_{n+1}$ as the external force inferred value, otherwise, outputs "0" as the external force inferred value. The difference between the velocity actual value and the velocity inferred value is calculated by performing differential operation between the velocity actual value and the velocity inferred value through a difference block 260.

That is, if the difference between the velocity actual value and the velocity inferred value is close to zero, then it can be judged that the external force inferred value output by the disturbance observer 200 is a value with a high inferring prevision, and if the difference is not close to zero, then it can be judged that the inferring precision is poor. When the disturbance observer 200 having the output limiting function of the present embodiment is applied, a reciprocal of the difference between the velocity actual value and the velocity inferred value is used as a value expressing reliability. If the reliability is small than or equal to a designated threshold, the reliability of a disturbance inferred value calculated at this point is low and cannot be output as an effective value and for example "0" is output. In this way, under the output limiting function of the present embodiment, if the difference between the velocity inferred value and the corresponding velocity actual value is smaller than the predetermined value, then it is judged that there is designated reliability. Besides, under the output limiting function, when it is judged that there is no designated reliability, "0" is output as the external force inferred value.

As more specific processing, the value expressing the reliability that is a reciprocal of the difference between the velocity actual value and the velocity inferred value can be evaluated, and as shown in FIG. 11, the reciprocal expressing the reliability that is a reciprocal of the difference between the velocity actual value and the velocity inferred value can be evaluated. When the difference between the velocity actual value and the velocity inferred value is evaluated, if a size of the difference is smaller than the designated threshold Th, then it can be considered that there is enough reliability.

By providing such output limiting function, the time waveform of the external force inferred value as shown in FIG. 10(b) can be obtained.

In addition, FIG. 11 illustrates a case that the external force inferred value $d_{n+1}$ and "0" output by the disturbance observer 200 is selectively output, but not limited thereto as long as an output state that can differentiate an effective external force inferred value and an ineffective external force inferred value is adopted. For example, when it is judged that the reliability is high, the external force inferred value calculated in the operation period on this time is output, otherwise, the external force inferred value output at the previous time is directly output, i.e., the external force inferred value is not unchanged. That is, under the output limiting function, when it is judged that there is no designated reliability, the output value of the external force inferred value output at the previous time is maintained.

The threshold Th can be decided by a user or can be dynamically decided by according to the setting of the disturbance observer 200. For example, a convergence parameter [G1, G2] is used to decide stability and convergence when the disturbance observer 200 performs convergence operation, the value of the convergence parameter prescribes overshot generated in the velocity inferred value, therefore the size of the threshold Th can be predetermined according to the convergence parameter.

E. Processing Order

Next, the external inferring processing contained in the control method of the present embodiment is explained.

Figure 12:
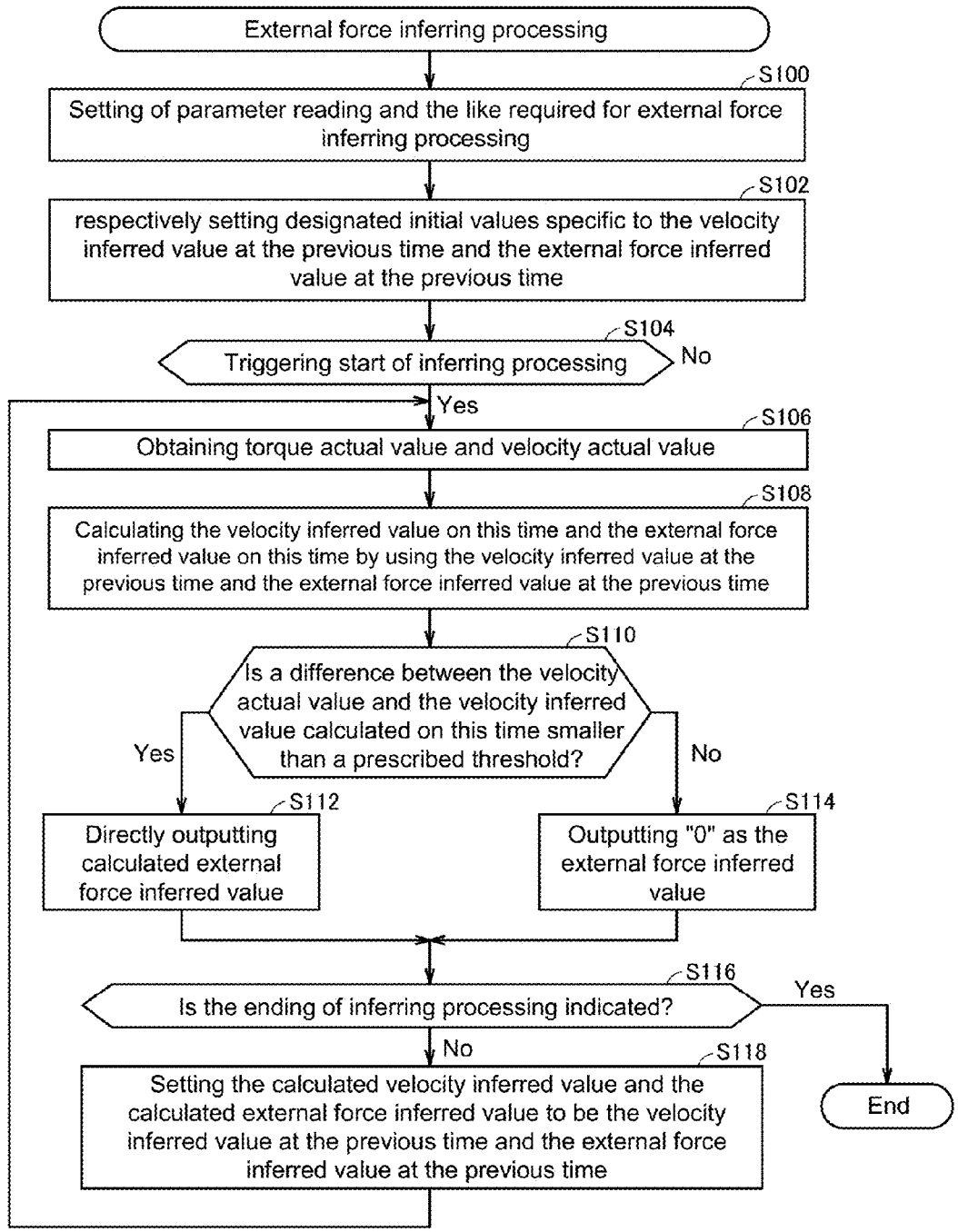
FIG. 12 is a flow diagram illustrating a processing order of external force inferring processing contained by a control method of the present embodiment.

FIG. 12 is a flow diagram illustrating a processing order of external force inferring processing contained by a control method of the present embodiment. Respective steps as shown in FIG. 12 are realized in a manner that the processor 110 of the operation processing unit 102 of the control device 100 executes the system program 122 and the user program 116.

Referring to FIG. 12, the processor 110 performs setup of the parameter reading and the like required for the external force inferring processing (step S100), Meanwhile, the processor 110 respectively sets designated initial values (typically all zero) specific to the velocity inferred value at the previous time and the external force inferred value at the previous time (step S102).

Then, if start of the inferring processing is triggered (Yes in step S104), the processor 110 obtains a torque actual value of a torque generated by the driving source 10 in order to drive the motion body and a velocity actual value expressing a velocity of the motion body (step S106). Besides, the processor 110 uses the velocity inferred value at the previous time and the external force inferred value at the previous time to calculate the velocity inferred value on this time and the external force inferred value on this time (step S108). That is, the processor 110 uses an operation formula of a predetermined model expressing driving of the motion body and calculates the external force inferred value expressing the external force generated by the control system and the corresponding velocity inferred value expressing the velocity of the motion body every operation period.

Then, the processor 110 judges whether a difference between the velocity actual value and the velocity inferred value calculated on this time is smaller than a predetermined threshold (step S110). If the difference between the velocity actual value and the velocity inferred value calculated on this time is smaller than a predetermined threshold (Yes in step S110), the processor 110 directly outputs an external force inferred value calculated in step S108 (step S112). Relatively, if the difference between the velocity actual value and the velocity inferred value calculated on this time is not smaller than a predetermined threshold (No in step S110), the processor 110 outputs "0" as the external force inferred value (step S114).

In steps S110-S114, after calculating the external force inferred value, the processor 110 evaluates a reliability of the external force inferred value based on the velocity inferred value calculated together, and effectively outputs the external force inferred value when it is judged that there is a designated reliability.

The processor 110 judges whether the ending of the inferring processing is indicated (step S116). If the ending of the inferring processing is not indicated (No in step S116), the velocity inferred value at the previous time and the external force inferred value at the previous time are set (step S118) and the processing after S106 is repeatedly executed.

If the ending of the inferring processing is indicated (Yes in step S116), the processing is ended.

F. Mounting Examples

Then, a constitution example when the external force inferring processing contained in the control method of the present embodiment is mounted on the user program 116 is explained.

FIG. 13 is a diagram illustrating an example of function blocks for defining execution of the control method of the present embodiment on a user program. In the function blocks as shown in FIG. 13, the servo driver 12 turned into an object and the motor 11 (object axis) are correlated, and parameters required for constituting the disturbance observer 200 are set. Specifically, a mass coefficient M, a viscosity resistance D, convergence parameters, an operation period, a reliability threshold (the threshold Th as shown in FIG. 11), etc., is input to the function blocks.

In addition, as the convergence parameters, the convergence parameters G1 and G2 as shown in formula (4) may not be directly designated, but a Pole value decided by the Ackerman pole assignment method under a repeated root is input.

A rating Torque and pitch input to the function blocks as shown in FIG. 13 are setting values of the servo driver 12 turned into the object and the motor 11.

The function blocks as shown in FIG. 13 will output the external force inferred value kept in the original form and calculated according to the formula (4) every other operation period and the external force inferred value selectively output by using the output limiting function (reflecting reliability). And, the function blocks as shown in FIG. 13 can calculate whether processing is an execution intermediate flag being executed by using the calculating expressing the external force inferred value of the observer.

Be adopting the function blocks as shown in FIG. 13, the user can still use the external force inferred value on the user program even not using a specific algorithm of the external force inferring processing, and thus can easily judge the additional processing such as a replacement period.

G. Statistical Processing

The external force inferring in an application example aims to decide a replacement period of the tool as a consumable. In such usage for deciding the replacement period, not only is the time waveform as shown in FIG. 10(b) is used, but also a result for performing statistical processing on the time waveform can be used.

As an example, an evaluation period with a predetermined length can be set for the time waveform of the external force inferred value as shown in FIG. 10(b) respectively, and distribution in each evaluation period is calculated. Specifically, it is in an order that the statistical processing is performed on the external force inferred value generated in (1) multiple time periods set to become an evaluated object and in (2) each time period.

Figures 14A, 14B:
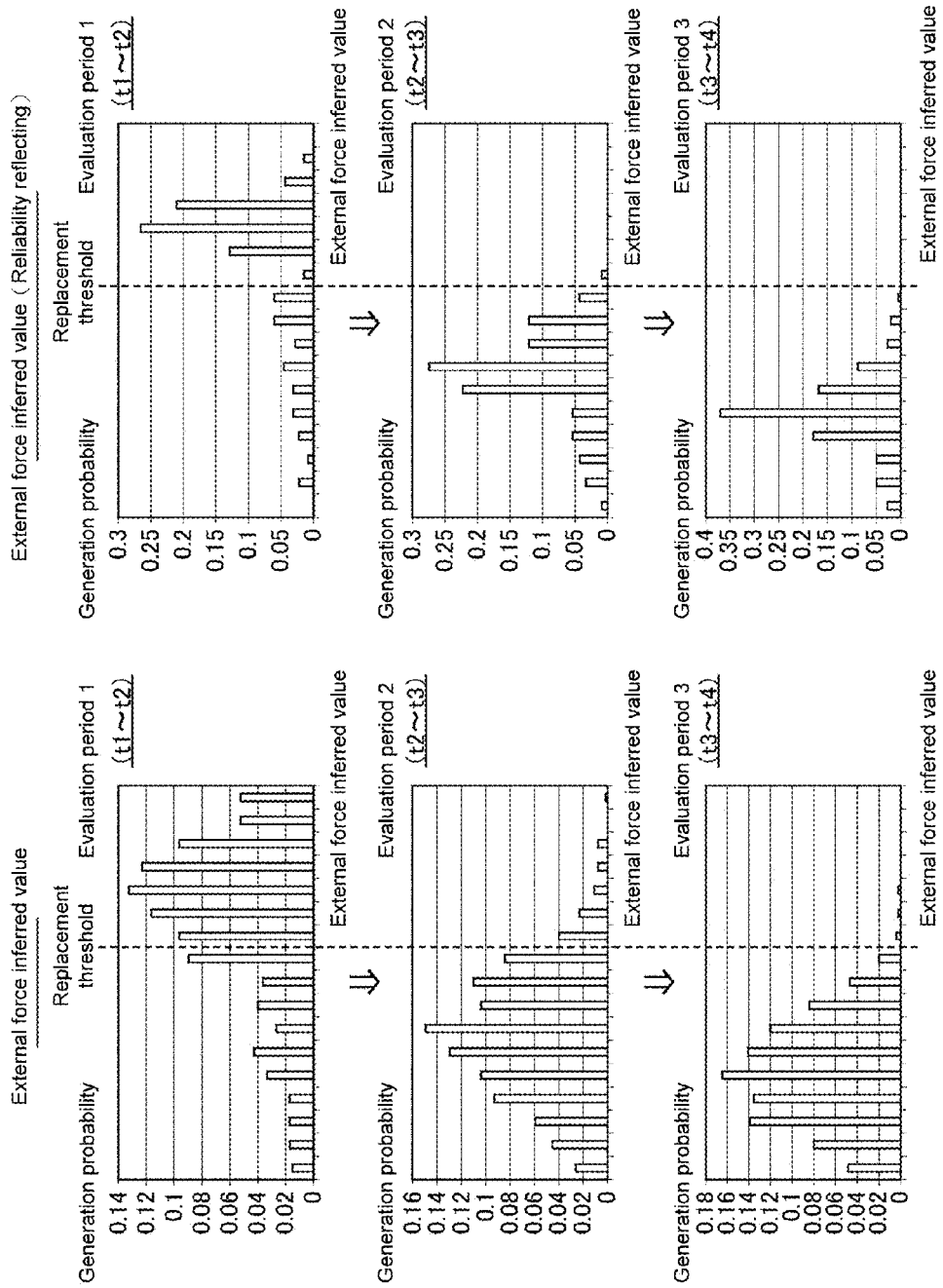
FIGS. 14(a) and 14(b) illustrate examples of statistical processing results of FIGS. 10(a) and 10(b).

FIGS. 14(a) and 14(b) illustrate examples of statistical processing results of FIGS. 10(a) and 10(b). FIG. 14(a) illustrates an example of a counting result that an external force inferred value (referring to FIG. 10(a)) output from the observer is directly used, and FIG. 14(b) illustrates an example of a counting result when an external force inferred value output from the observer applies an output limiting function.

FIGS. 14(a) and 14(b) respectively express distribution of generation probability of the external force inferred values calculated in an evaluation period 1 (moment t1–t2), an evaluation period 2 (moment t2–t3) and an evaluation period 3 (t2–t3).

The function of generating and outputting the statistical processing results as shown FIGS. 14(a) and 14(b) can be provided by the control device 100, and can also be provided by an external information processing device obtaining the external force inferred value from the control device 100 and executes various processing. When provided by the control device 100, the function can be used for mounting of a function module contained in the user program 116 (FIG. 3).

In this case, the function module contained in the user program 116 contains a counting function, specific to the external force inferred value in a designated period, divides this designated period into a plurality of periods, and outputs a distribution of a generation probability of the external force inferred value in each divided period. In addition, a length of the period of a counted object can be freely set by a user, and can also be set by automatic dividing.

This statistical distribution can be used as a means for clearing a replacement criterion of a cutting tool. For example, a following rule is set: a certain replacement threshold is set for an external force inferred value, when a generated external force is smaller than or equal to its replacement threshold, the tool is replaced. Hence, threshold replacement can be properly set according to specialized skill or experience of certain operator.

The operator setting the rule can know a replacement time sequence of the tool depending on feelings, but the operator with less experience cannot know the replacement time sequence of the tool, and still relies on an actually output external force inferred value. A distribution range in the example as shown in FIG. 14(*a*) is large, and the evaluation period in which, that is after how long, the tool should be replaced cannot be clearly known. Relatively, when the output limiting function of the present embodiment is applied, the generation distribution of the external force inferred value is narrow, and the size in which the external force inferred value has a peak value can be mastered in short time. That is, mastering can be realized in short time, the external force more than the replacement threshold is generated in the evaluation period 1 (moment t1–t2), and the generated external force after the evaluation period 2 (moment t2–t3) is turned into the replacement threshold. Therefore, even for an operator with less experience, the operator can still easily judges that the tool should be replaced in the evaluation period 2 (moment t2–t3).

As mentioned above, specific to the external force inferred value output every other operation period, the generated value distribution is used, therefore, the reduction of the external force generated due to wearing of the tool can be more easily mastered, such that the replacement time sequence of the tool cal be regularly used in a preset manner without depending on an operator.

H. Application Example·Variable Example

In the present embodiment, the processing and functions are explained with a premise of being applied to a machining device similar to an imprinter as shown in FIG. 1, is not limited to such machining device and can be applied to any system. In such case, only a numerical model expressing an observed object can be properly selected or designed according to a system as an applied object.

As an application example except for the machining device as shown in FIG. 1, for example, a device (called as "pickup and placing device") pulling a workpiece up and then carrying to other occasions is listed.

Figure 15:
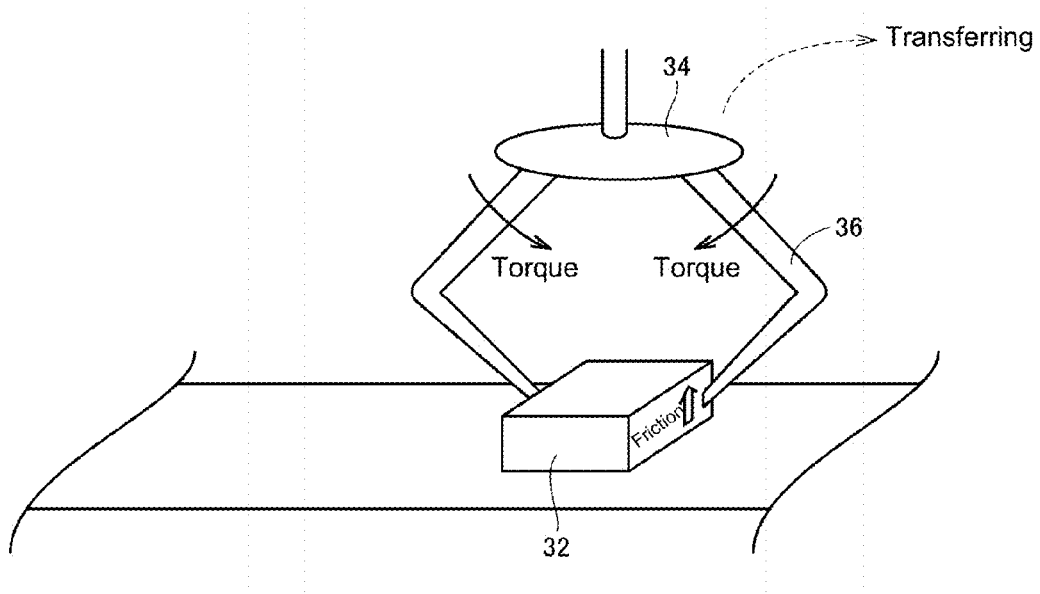
FIG. 15 is a schematic diagram illustrating a summary of a pickup and placing device.

FIG. 15 is a schematic diagram illustrating a summary of a pickup and placing device. Referring to FIG. 15, a transferring device 34 has two or more than two arms 36, these arms 36 are pressed on a workpiece to generate a friction force, and the workpiece 32 is pulled up and carried to a target occasion. As a project of such transferring device 34, actions that the workpiece 32 falls down and cannot be grasped perfectly are listed.

Generally, a camera is used to monitor whether these abnormal actions occur. The reason is that in the transferring device 34, a fixing (picking up) position for the workpiece 32 and the placing position for the workpiece 32 are different every time, and even though the same action, a difference is generated in some degree among the carrying manners.

That is, a regular torque model cannot be prepared, therefore it is hard to judge whether the workpiece 32 is perfectly grasped. The constitution that the arms 36 of the transferring device 34 are pressed on the workpiece 32 to generate a friction force is similar to the machining device as shown in FIG. 1. That is, even though the carrying manner is different every time, but the constitution of the transferring device 34 is not changed, therefore, by using the disturbance observer as mentioned above, the friction force generated between the workpiece 32 and the arms 36 are inferred in sequence, than the monitoring on a pickup fault, a placing fault or monitoring on a degradation tendency of the transferring device 34 for the workpiece 32 can be avoided.

Similarly, in a system containing an unmanned carrying vehicle, an inferring method for various state values of the present embodiment can also be provided.

I. Advantages

According to the present embodiment, as long as the object device is modelled, a state value that cannot be directly observed can be inferred with a high precision. Therefore, even though for an application program of which a move or action is subtly different every time, the degradation and abnormality of the device can be detected with a high accuracy. That is, according to the present embodiment, the change of the characteristic owned by the object device or system can be detected with a high precision, and therefore, processing such as monitoring and abnormality detecting with a higher precision can be provided.

It should be appreciated that all aspects of the embodiment disclosed herein are all intended for exemplifying instead of limiting. A scope of the present invention is not expressed by claims rather than the explanation and contains all changes in equivalent meanings and scopes of the claims.

What is claimed is:

1. A control device that controls a control system which contains a motion body and a driving source driving the motion body, comprising:
   a processor to implement:
      an actual value obtaining part, obtaining a torque actual value and a velocity actual value, wherein the torque actual value represents a torque generated by the driving source for driving the motion body and the velocity actual value represents a velocity of the motion body;
      an inferring part, which calculates an external force inferred value and a velocity inferred value every other operation period based on the torque actual value by using an operation formula of a predetermined model representing driving of the motion body, wherein the external force inferred value represents an external force generated by the control system, the velocity inferred value corresponds to the external force inferred value and represents a velocity of the motion body, and the operation formula contains items for updating the velocity inferred value and the external force inferred value such that the velocity actual value and the velocity inferred value are consistent; and
      an output part, evaluating a reliability of the external force inferred value based on the velocity inferred value calculated together if the inferring part calculates the external force inferred value, and effectively outputting the external force inferred value when it is judged that there is a designated reliability,
wherein the output part judges that there is the designated reliability when a difference between the velocity inferred value and the corresponding velocity actual value is smaller than a predetermined value,
wherein the output part maintains an output value of the external force inferred value output at the previous time when judging there is no designated reliability,
where the designated reliability is dynamically decided by a setting of a disturbance observer.

2. The control device according to claim 1, wherein the output part outputs zero as the external force inferred value when judging that there is no designated reliability.

3. The control device according to claim 1, wherein the operation formula contains a mass coefficient of the motion body and a viscosity resistance of the motion body as parameters.

4. The control device according to claim 1, further comprising a statistical part, which, specific to the external force inferred value output by the output part in a designated period, divides the designated period into a plurality of periods and outputs distribution of a generation probability of the external force inferred value in each divided period.

5. A control program stored in a non-transitory storage that controls a control system which contains a motion body and a driving source driving the motion body, enabling a computer to execute the steps as follows:
obtaining a torque actual value and a velocity actual value, wherein the torque actual value represents a torque generated by the driving source for driving the motion body and the velocity actual value represents a velocity of the motion body;
calculating an external force inferred value and a velocity inferred value every other operation period based on the torque actual value by using an operation formula of a predetermined model representing driving of the motion body, wherein the external force inferred value represents an external force generated by the control system, the velocity inferred value corresponds to the external force inferred value and represents a velocity of the motion body, and the operation formula contains items for updating the velocity inferred value and the external force inferred value such that the velocity actual value and the velocity inferred value are consistent;
evaluating a reliability of the external force inferred value based on the velocity inferred value calculated together if the external force inferred value is calculated, and effectively outputting the external force inferred value when it is judged that there is a designated reliability; and
maintaining an output value of the external force inferred value output at the previous time when judging there is no designated reliability, where the designated reliability is dynamically decided by a setting of a disturbance observer,
wherein the step of evaluating the reliability of the external force inferred value based on the velocity inferred value calculated together if the external force inferred value is calculated comprises:
judging that there is the designated reliability when a difference between the velocity inferred value and the corresponding velocity actual value is smaller than a predetermined value.

6. A control method that controls a control system which contains a motion body and a driving source driving the motion body, comprising the steps as follows:
obtaining a torque actual value and a velocity actual value, wherein the torque actual value represents a torque generated by the driving source for driving the motion body and the velocity actual value represents a velocity of the motion body;
calculating an external force inferred value and a velocity inferred value every other operation period based on the torque actual value by using an operation formula of a predetermined model representing driving of the motion body, wherein the external force inferred value represents an external force generated by the control system, the velocity inferred value corresponds to the external force inferred value and represents a velocity of the motion body, and the operation formula contains items for updating the velocity inferred value and the external force inferred value such that the velocity actual value and the velocity inferred value are consistent;
evaluating a reliability of the external force inferred value based on the velocity inferred value calculated together if the external force inferred value is calculated, and effectively outputting the external force inferred value when it is judged that there is a designated reliability; and
maintaining an output value of the external force inferred value output at the previous time when judging there is no designated reliability, where the designated reliability is dynamically decided by a setting of a disturbance observer,
wherein the step of evaluating the reliability of the external force inferred value based on the velocity inferred value calculated together if the external force inferred value is calculated comprises:
judging that there is the designated reliability when a difference between the velocity inferred value and the corresponding velocity actual value is smaller than a predetermined value.

* * * * *